(12) United States Patent
Hu et al.

(10) Patent No.: US 12,304,231 B2
(45) Date of Patent: May 20, 2025

(54) OPTICAL ANTI-COUNTERFEITING ELEMENT AND MANUFACTURING METHOD THEREFOR

(71) Applicants: Zhongchao Special Security Technology Co., Ltd., Beijing (CN); China Banknote Printing and Minting Corp., Beijing (CN)

(72) Inventors: Chunhua Hu, Beijing (CN); Jun Zhu, Beijing (CN); Weiwei Zhang, Beijing (CN); Kai Sun, Beijing (CN)

(73) Assignees: Zhongchao Special Security Technology Co., Ltd., Beijing (CN); China Banknote Printing and Minting Corp., Beijing (CN)

( * ) Notice: Subject to any disclaimer, the term of this patent is extended or adjusted under 35 U.S.C. 154(b) by 844 days.

(21) Appl. No.: 17/600,014

(22) PCT Filed: Mar. 27, 2020

(86) PCT No.: PCT/CN2020/081592
§ 371 (c)(1),
(2) Date: Sep. 29, 2021

(87) PCT Pub. No.: WO2020/200070
PCT Pub. Date: Oct. 8, 2020

(65) Prior Publication Data
US 2022/0176726 A1   Jun. 9, 2022

(30) Foreign Application Priority Data

Mar. 29, 2019   (CN) .......................... 201910251304.8

(51) Int. Cl.
| | | |
|---|---|---|
| *G02B 5/00* | (2006.01) | |
| *B42D 25/324* | (2014.01) | |
| *B42D 25/328* | (2014.01) | |
| *B42D 25/373* | (2014.01) | |
| *B42D 25/45* | (2014.01) | |
| *G02B 5/18* | (2006.01) | |
| *B42D 25/24* | (2014.01) | |
| *B42D 25/29* | (2014.01) | |

(52) U.S. Cl.
CPC ......... *B42D 25/324* (2014.10); *B42D 25/328* (2014.10); *B42D 25/373* (2014.10);
(Continued)

(58) Field of Classification Search
CPC ...... G02B 5/18; G02B 5/1857; G02B 5/1861; G02B 5/1866; B42D 25/324;
(Continued)

(56) References Cited

FOREIGN PATENT DOCUMENTS

| CN | 201680848 U | 12/2010 |
|---|---|---|
| CN | 104647934 A | 5/2015 |

(Continued)

OTHER PUBLICATIONS

International Search Report issued in connection with Application No. PCT/CN2020/081592 dated Jun. 11, 2020.
(Continued)

*Primary Examiner* — Henry Duong
(74) *Attorney, Agent, or Firm* — Dennemeyer & Associates LLC

(57) ABSTRACT

An optical anti-counterfeiting element and manufacturing methods of the optical anti-counterfeiting element are provided. The optical anti-counterfeiting element includes an undulating structure layer provided with a first area, a second area and a third area; the first area has a first microstructure; the second area has a second microstructure; the third area is an unstructured flat area; a specific volume of the second microstructure is greater than a specific volume of the first microstructure; the first area and the third area are respectively provided with a reflecting layer, a dielectric layer and an absorbing layer which are overlapped, and the second area is not provided with a reflecting layer; and a surface appearance of one side, far away from the undulating structure layer, of the dielectric layer of the first
(Continued)

area is obviously different from a surface appearance of the undulating structure layer.

19 Claims, 5 Drawing Sheets

(52) U.S. Cl.
CPC ........... *B42D 25/45* (2014.10); *G02B 5/1857* (2013.01); *B42D 25/24* (2014.10); *B42D 25/29* (2014.10)

(58) Field of Classification Search
CPC .... B42D 25/328; B42D 25/373; B42D 25/45; B42D 25/24; B42D 25/29; B42D 25/36; B42D 25/21; B42D 25/22; B42D 25/40
USPC ........................................................ 359/571
See application file for complete search history.

(56) References Cited

FOREIGN PATENT DOCUMENTS

| | | | | |
|---|---|---|---|---|
| CN | 105015215 | B | | 11/2015 |
| CN | 106891637 | A | * | 6/2017 |
| CN | 107000463 | A | | 8/2017 |
| CN | 107521251 | A | | 12/2017 |
| DE | 102016007649 | A1 | * | 12/2017 ............. B42D 25/29 |
| JP | 2005525946 | A | | 9/2005 |
| JP | 2005533290 | A | | 11/2005 |
| JP | 2008107472 | A | | 5/2008 |
| JP | 2008107472 | B2 | | 5/2008 |
| JP | WO2010147185 | A1 | | 12/2010 |
| JP | 2016080848 | A | | 5/2016 |
| JP | 2016200628 | A | | 12/2016 |
| WO | 2008017362 | A2 | | 2/2008 |
| WO | 2008017362 | A3 | | 2/2008 |
| WO | 2010147185 | A1 | | 12/2010 |
| WO | 2017211450 | A1 | | 12/2017 |
| WO | 2018103882 | A1 | | 6/2018 |

OTHER PUBLICATIONS

Extended European Search Report and invitation to proceed with application for 20784976.1 mailed on Nov. 17, 2022.
English translation of first Japanese office action for application No. 2021555864 mailed on Oct. 18, 2022.
English translation of second Japanese office action for application No. 2021555864 mailed on Mar. 14, 2023.
English translation of third Japanese office action for application No. 2021555864.

* cited by examiner

OPTICAL ANTI-COUNTERFEITING ELEMENT AND MANUFACTURING METHOD THEREFOR

CROSS-REFERENCE TO RELATED APPLICATIONS

This is a 35 U.S.C. 371 National Stage Patent Application of International Application No. PCT/CN2020/081592, filed Mar. 27, 2020, which claims priority to Chinese application 201910251304.8, filed Mar. 29, 2019, each of which is hereby incorporated by reference in its entirety.

TECHNICAL FIELD

The disclosure relates to the field of optical anti-counterfeiting technology, in particular to an optical anti-counterfeiting element and manufacturing methods of the optical anti-counterfeiting element.

BACKGROUND

In order to prevent counterfeiting generated by means of scanning, copying and the like, an optical anti-counterfeiting technology is widely adopted in various high-safety or high-added-value printed matters such as banknotes, credit cards, passports, securities and product packages, and a very good effect is achieved.

In various optical anti-counterfeiting technologies, optical effects such as diffraction and non-diffraction formed by a microstructure are widely applied due to good compatibility with image design and obvious dynamic effect. In order to increase the brightness of images, the microstructure optical anti-counterfeiting technology generally adopts a metal reflecting layer, such as aluminum. The optical anti-counterfeiting technology, namely holographic technology, which is the most widely applied to optical films at present is an optical technology developed by utilizing a diffraction effect formed by the microstructure. The holographic technology is adopted for anti-counterfeiting threads of the 5th set of 5-yuan, 10-yuan, 20-yuan, 50-yuan and 100-yuan RMB (1999 edition), and when the RMB face is shaken, a shiny holographic face digital image may be observed. In addition, a multi-layer interference optically variable technology is increasingly paid attention by people due to the fact that the multi-layer interference optically variable technology has a strong optical color-changing effect under different observation viewing angles. The multi-layer interference optically variable technology generally adopts a vapor deposition method to realize evaporation of a reflecting layer, a dielectric layer and an absorbing layer. The reflecting layer, the dielectric layer and the absorbing layer form a basic unit of an interference optically variable plating layer. The material of the reflecting layer is generally thick and high in reflectivity, and the material of the absorbing layer is generally thin and has the feature of being semi-transparent. The dielectric layer is a transparent material, and if the thickness meets a certain condition, light rays may interfere in a Fabry-Perot cavity formed by the reflecting layer and the absorbing layer which are parallel to each other. Observed from one side of the absorbing layer, the interference optically variable plating layer shows different colors at different angles. The multi-layer interference optically variable technology is adopted for security threads of the 5th set of 100-yuan RMB (2015 edition), and magenta color is shown in front view observation and green color is shown in inclined observation. If holography, non-diffraction and other optical microstructure anti-counterfeiting technologies and the multi-layer interference optically variable technology are integrated into the same product, the dynamic effect shown by holography and non-diffraction and the optically variable effect shown by multi-layer plating layer may be effectively exerted, and then the anti-counterfeiting effect may be enhanced to a certain extent. However, if the multi-layer interference plating layer is directly evaporated on the optical microstructure, the optical effect shown by the optical microstructure and the interference optically variable effect are weakened mutually.

The patent application CN 200980104829.3 provides a preparation method of an optical anti-counterfeiting product integrating multi-layer interference optically variable feature and high-brightness reflecting microstructure (including a diffraction microstructure and a non-diffraction microstructure) optical feature through a local printing hollowing process, that is, part of area has the multi-layer interference optically variable feature, part of area has the high-brightness reflecting microstructure optical feature, and other areas have a hollowing effect. However, the precision of a local hollowed-out area in this patent application depends on the precision of printing, which is generally 100 um or above, so that the application in high-end anti-counterfeiting optical products is limited to a certain extent.

Therefore, the manufacturing of an optical anti-counterfeiting element which has mutually independent optical microstructure (such as holography and non-diffraction) anti-counterfeiting feature and multi-layer interference optically variable optical feature, has a hollowed-out area high in precision relative to an image area of the optical microstructure, and even may be used for zero-error positioning is of great significance for researching feature positioning of the optical anti-counterfeiting element.

SUMMARY

The embodiment of the disclosure provides an optical anti-counterfeiting element and manufacturing methods of the optical anti-counterfeiting element. The optical anti-counterfeiting element has mutually independent optical microstructure (such as holography and non-diffraction) anti-counterfeiting feature and multi-layer interference optically variable optical feature, and is provided with a hollowed-out area which is strictly positioned with an image of an optical microstructure.

In order to achieve the purpose, the embodiment of the disclosure provides an optical anti-counterfeiting element. The optical anti-counterfeiting element includes an undulating structure layer provided with a first area, a second area and a third area. The first area has a first microstructure. The second area has a second microstructure. The third area is an unstructured flat area. A specific volume of the second microstructure is greater than a specific volume of the first microstructure. The first area and the third area are respectively provided with a reflecting layer, a dielectric layer and an absorbing layer which are overlapped, and the second area is not provided with a reflecting layer. A surface appearance of one side, far away from the undulating structure layer, of the dielectric layer of the first area is obviously different from a surface appearance of the undulating structure layer. It is to be noted that the first area, the second area and the third area should not be considered as only being in a fixed sequence on the undulating structure layer, but may also be in any other sequence such as the second area, the first area and the third area. During reflection observation of the optical anti-counterfeiting element, the first area shows a specific image shown by the first microstructure and has no or weak interference optically variable effect, the third area has an obvious interference optically variable effect, and during perspective observation, the second area has a light-transmitting hollowing effect and is strictly positioned with the image shown by the first area. The specific volume of the microstructure refers to the ratio of the volume of liquid just filled in the microstructure to the projection area of the microstructure when the optical anti-counterfeiting element is placed horizontally, and the unit of the specific volume is $um^3/um^2$. The difference between the microstructure of the second area and the microstructure of the first area is set to meet the requirement of hollowing, that is, the reflecting layer on the microstructure with the small specific volume is reserved, and the reflecting layer on the microstructure with the large specific volume is removed. This issue will continue to be discussed in greater depth in the specific implementation modes.

In an embodiment, the first microstructure is one of a periodic structure and an aperiodic structure, or a combined structure of the periodic structure and the aperiodic structure.

The cross section structure of the first microstructure along an extension direction is:
one of a sinusoidal structure, a rectangular grating structure, a half round structure and a blazed grating structure, or a structure formed by combining at least any two of the sinusoidal structure, the rectangular grating structure, the half round structure and the blazed grating structure.

In an embodiment, the range of the specific volume of the first microstructure is greater than 0.05 $um^3/um^2$ and smaller than 0.5 $um^3/um^2$.

In an embodiment, the range of the specific volume of the first microstructure is greater than 0.1 $um^3/um^2$ and smaller than 0.3 $um^3/um^2$.

In an embodiment, the second microstructure is one of a periodic structure and an aperiodic structure, or a combined structure of the periodic structure and the aperiodic structure.

The cross section structure of the second microstructure along an extension direction is:
one of a sinusoidal structure, a rectangular grating structure, a half round structure, a trapezoidal structure and a blazed grating structure, or a structure formed by combining at least any two of the sinusoidal structure, the rectangular grating structure, the half round structure, the trapezoidal structure and the blazed grating structure.

In an embodiment, the range of the specific volume of the second microstructure is greater than 0.1 $um^3/um^2$ and smaller than 1 $um^3/um^2$.

In an embodiment, the range of the specific volume of the second microstructure is greater than 0.2 $um^3/um^2$ and smaller than 0.5 $um^3/um^2$.

In an embodiment, the material of the reflecting layer includes:
one of aluminum, silver, copper, tin, chromium, nickel and titanium, or is an alloy formed by combining at least any two of aluminum, silver, copper, tin, chromium, nickel and titanium.

The dielectric layer is formed by printing.

A main resin of the dielectric layer includes:
one of polyurethane, acrylic acid and polyester, or a polymer formed by combining at least any two of polyurethane, acrylic acid and polyester.

The material of the absorbing layer includes:
one of nickel, chromium, aluminum, silver, copper, tin and titanium, or is an alloy formed by combining at least any two of nickel, chromium, aluminum, silver, copper, tin and titanium.

In an embodiment, the reflecting layer is adjacent to the undulating structure layer. Here, the order of the layers is further set, and if the undulating structure layer is selected as a reference bottom, the undulating structure layer, the reflecting layer, the dielectric layer and the absorbing layer are sequentially arranged from bottom to top.

In an embodiment, the second area is not provided with the reflecting layer, the dielectric layer and the absorbing layer.

In an embodiment, the absorbing layer is adjacent to the undulating structure layer. Here, the order of the layers is further set, and if the undulating structure layer is selected as a reference bottom, the undulating structure layer, the absorbing layer, the dielectric layer and the reflecting layer are sequentially arranged from bottom to top.

In an embodiment, the second area is provided with the reflecting layer and the absorbing layer.

The embodiment of the disclosure provides a manufacturing method of an optical anti-counterfeiting element. The manufacturing method includes the following steps.

In S1), an undulating structure layer is formed, the undulating structure layer includes a first area, a second area and a third area, the first area has a first microstructure, the second area has a second microstructure, the specific volume of the second microstructure is greater than a specific volume of the first microstructure, and the third area is an unstructured flat area.

In S2), a reflecting layer, a dielectric layer and an absorbing layer are sequentially formed on the undulating structure layer, the reflecting layer is formed through vapor deposition, the dielectric layer is formed through printing, and the absorbing layer is formed through vapor deposition.

In S3), the semi-finished product in S2) is put in a corrosive atmosphere capable of reacting with the material of the reflecting layer until the reflecting layer of the second area is completely or partially removed.

Specifically, S3) further includes the following sub-step, in the process that the reflecting layer of the second area is completely or partially removed.

The dielectric layer and the absorbing layer of the second area are also completely or partially removed.

The embodiment of the disclosure provides another manufacturing method of an optical anti-counterfeiting element. The manufacturing method includes the following steps.

In S1), an undulating structure layer is formed, the undulating structure layer includes a first area, a second area and a third area, the first area has a first microstructure, the second area has a second microstructure, the specific volume of the second microstructure is greater than a specific volume of the first microstructure, and the third area is an unstructured flat area.

In S2), an absorbing layer, a dielectric layer and a reflecting layer are sequentially formed on the undulating structure layer, the reflecting layer is formed through vapor deposition, the dielectric layer is formed through printing, and the absorbing layer is formed through vapor deposition.

In S3), after the reflecting layer is formed, a printing process is applied in a different thickness mode to form a protection layer, and the different thickness mode is that the minimum thickness of the protection layer of the first area is obviously greater than the minimum thickness of the protection layer of the second area.

In S4), the semi-finished product in S3) is put in a corrosive atmosphere capable of reacting with the material of the reflecting layer for permeability improvement until the reflecting layer of the second area is completely or partially removed.

Specifically, S4) further includes the following sub-step, in the process that the reflecting layer of the second area is completely or partially removed.

The reflecting layer of the second area is removed, and neither the dielectric layer nor the absorbing layer is removed.

Specifically, the method further includes the following step.

An inorganic or organic plating layer is continuously applied, or a coating layer is continuously applied, so that other optical anti-counterfeiting functions or auxiliary functions are realized.

Through the above content, the undulating structure layer with asymmetric and surface heterogeneous feature is realized, the undulating structure layer is used for manufacturing a plurality of relatively independent local areas, particularly, the local section heterogeneous asymmetry of the optical anti-counterfeiting element is realized through the areas at least having the multi-layer interference optically variable feature, and a hollowed-out area formed by the plurality of relatively independent local areas of the optical anti-counterfeiting element is high in local image detail precision and clear in transmission imaging.

Further features and advantages of the embodiments of the disclosure will be explained in detail in the specific implementation modes which follow.

BRIEF DESCRIPTION OF THE DRAWINGS

The drawings are provided to provide a further understanding of the embodiments of the disclosure and constitute a part of this specification, and together with the following specific implementation modes, serve to explain the embodiments of the disclosure but do not constitute a limitation of the embodiments of the disclosure. In the drawings.

Figure 1:
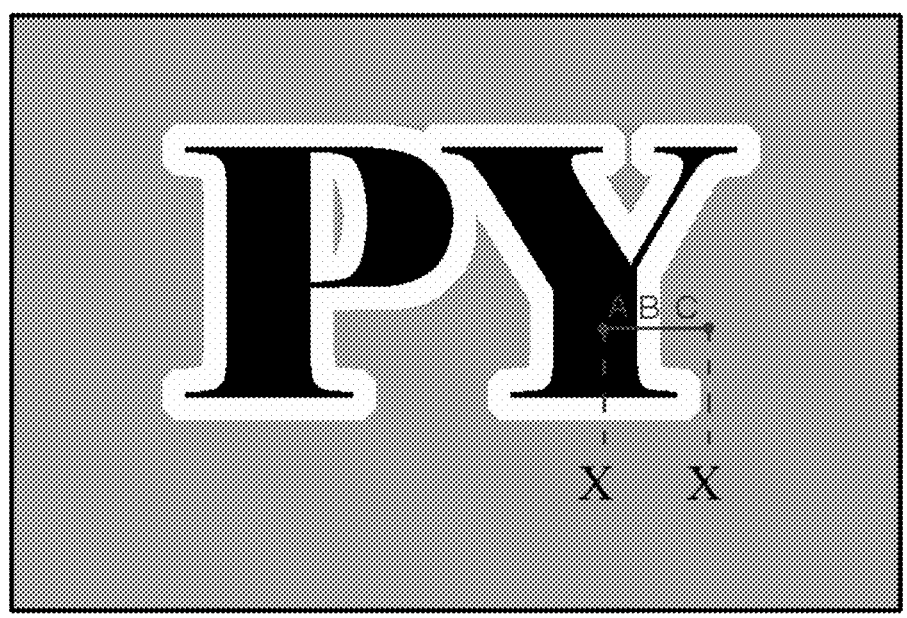
FIG. 1 is a schematic diagram of a top view of an optical anti-counterfeiting element according to an embodiment of the disclosure.

| Description of Reference Numerals | |
| --- | --- |
| A. Image area | B. Hollowed-out area |
| C. Interference optically variable area | 1. Substrate |
| 2. Undulating structure layer | 3. Interference optically variable layer |
| 31. Reflecting layer | 32. Dielectric layer |
| 33. Absorbing layer | 4. Other function coating layers |
| 5. Protection layer | |

DETAILED DESCRIPTION OF THE EMBODIMENTS

The specific implementation modes of the embodiments of the disclosure will be described in detail below with reference to the drawings. It is to be understood that the specific implementation modes described herein are for the purpose of illustrating and explaining the embodiments of the disclosure only and are not intended to limit the embodiments of the disclosure.

Embodiment 1

An optical anti-counterfeiting element includes an undulating structure layer 2. The undulating structure layer 2 at least includes a first area composed of a first microstructure with a small specific volume, a second area composed of a second microstructure with a large specific volume and a flat unstructured third area. The first area and the third area are respectively provided with a reflecting layer 31, a printed dielectric layer 32 and an absorbing layer 33, and the second area is not provided with the reflecting layer 31.

As shown in FIG. 1, for the optical anti-counterfeiting element, the first area is taken as an image area A, the second area is taken as a hollowed-out area B, and the third area is taken as an interference optically variable area C. The image area A has the optical feature of high brightness reflection microstructure (such as holographic or non-diffraction optical microstructures), generally shown in a particular image, such as the 'PY' letters shown. During reflection observation of the interference optically variable area C, different colors are shown at different angles. During perspective observation, the hollowed-out area B has a light-transmitting or semi-light-transmitting effect. The hollowed-out area B is strictly positioned with the image area A in an error-free manner, for example, the hollowed-out area B in FIG. 1 strictly surrounds the boundary of the image area A, appearing as the outline of the image. The fineness of the hollowed-out area may be very high, for example, may be smaller than 10 um.

Figure 2:
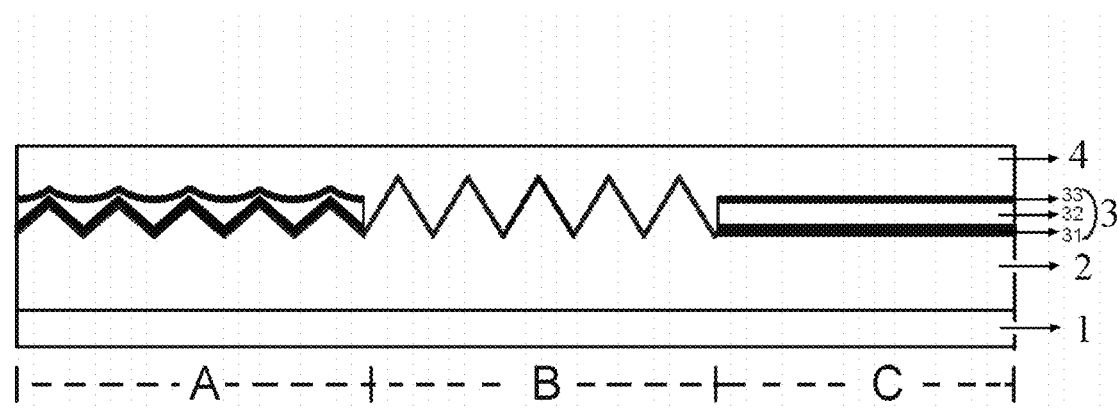
FIG. 2 is a schematic diagram of a cross-sectional view of an anti-counterfeiting element along a pattern 'X-X' according to an embodiment of the disclosure (an undulating structure layer with a first surface microstructure).

FIG. 2 is a possible schematic diagram of a cross-sectional view of an exemplary optical anti-counterfeiting element as shown in FIG. 1 along X-X. An optical anti-counterfeiting element includes a substrate 1, an undulating structure layer 2, an interference optically variable layer 3 (including a reflecting layer 31, a dielectric layer 32 and an absorbing layer 33) and other function coating layers 4. The undulating structure layer 2 includes a first area A composed of a first microstructure with a small specific volume, a second area B composed of a second microstructure with a large specific volume and a flat unstructured third area C. The first area A and the third area C are respectively provided with a reflecting layer 31, a dielectric layer 32 and an absorbing layer 33, and the second area is not provided with a reflecting layer 31, a dielectric layer 32 and an absorbing layer 33. The dielectric layer 32 is formed by printing, so that the dielectric layer 32 of the first area A realizes non-conformal coverage with the undulating structure layer 2 and the reflecting layer 31, and an effective Fabry-Perot interference cavity is not formed between the reflecting layer 31 and the absorbing layer 33, that is, the first area A shows no or weak interference optically variable effect. The undulating structure layer 2 of the third area C is of a flat structure, and an effective Fabry-Perot interference cavity is formed between the reflecting layer 31 and the absorbing layer 33, so that an obvious interference optically variable effect is shown. The second area B is not provided with the reflecting layer 31, the dielectric layer 32 and the absorbing layer 33, so that a high-transmittance hollowing effect is shown in perspective observation. Other function coating layers 5 may be provided as desired, such as a bonding layer that bonds to a protected main product.

Figure 3:
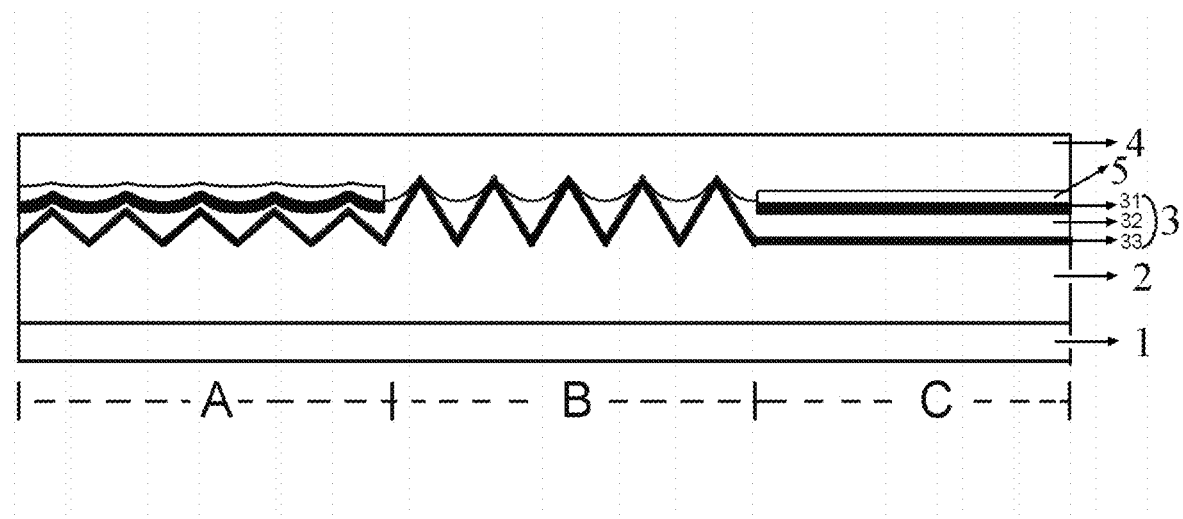
FIG. 3 is a schematic diagram of a cross-sectional view of an anti-counterfeiting element along a pattern 'X-X' according to an embodiment of the disclosure (an undulating structure layer with a second surface microstructure).

FIG. 3 is another possible schematic diagram of a cross-sectional view of an exemplary optical anti-counterfeiting element as shown in FIG. 1 along X-X. An optical anti-counterfeiting element includes a substrate 1, an undulating structure layer 2, an interference optically variable layer 3 (including a reflecting layer 31, a dielectric layer 32 and an absorbing layer 33), a protection layer 5 and other function coating layers 4. Similar to FIG. 2, the undulating structure layer 2 includes a first area A composed of a first microstructure with a small specific volume, a second area B composed of a second microstructure with a large specific volume and a flat unstructured third area C. But different from FIG. 2, the absorbing layer 33 is adjacent to the undulating structure layer 2, and the second area B is not provided with the reflecting layer 31, but is provided with the dielectric layer 32 and the absorbing layer 33. Due to the existence of the absorbing layer 33, the second area B shows a semi-light-transmitting hollowing effect during perspective observation. The protection layer 5 is introduced for protecting the reflecting layer 31 on the first area A and the third area C in the manufacturing process.

A method for manufacturing an anti-counterfeiting element as shown in FIG. 2 according to the disclosure will be described below in combination with FIG. 4. The method includes steps S11 to S13.

Figure 4:
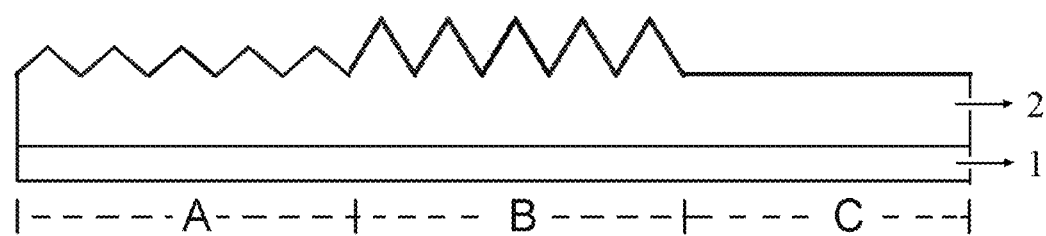
FIG. 4 is a schematic diagram of a cross-sectional view of a semi-finished product after an undulating structure layer having a first area, a second area and a third area is formed according to an embodiment (with a first surface microstructure) of the disclosure.

In S11, an undulating structure layer 2 is formed on a substrate 1, the undulating structure layer 2 includes a first area A composed of a first microstructure with a small specific volume, a second area B composed of a second microstructure with a large specific volume and a flat unstructured third area C, as shown in FIG. 4.

The substrate 1 may be at least partially transparent, may also be a colored dielectric layer 32, may be a transparent medium film with function coating layers on the surface, and may also be a multi-layer film formed by compounding. The substrate 1 is generally formed by a film material having good physical and chemical resistance and high mechanical strength, for example, a plastic film such as a PolyEthylene Terephthalate (PET) film, a PolyEthylene Naphthalate (PEN) film, or a PolyPropylene (PP) film may be used to form the substrate 1, and the substrate 1 is preferably formed by the PET material. A bonding enhancement layer may be included on the substrate 1 to enhance bonding of the substrate 1 to the undulating structure layer 2.

The undulating structure layer 2 may be formed by performing batch copying through processing modes such as ultraviolet casting, mould pressing and nano-imprinting. For example, the undulating structure layer 2 may be formed by thermoplastic resin through the mould pressing process, that is, the thermoplastic resin coated on the substrate 1 in advance is heated to be softened and deformed when passing through a high-temperature metal template, so that a specific undulating structure is formed, and then cooling and molding are performed. The undulating structure layer 2 may also be formed by a radiation curing casting process, namely, a radiation curing resin is applied to the substrate 1, an original template is pushed thereon, meanwhile, irritating of radioactive rays such as ultraviolet rays or electron beams is carried out, so that the material is cured, and then the original template is removed to form the undulating structure layer 2.

The undulating structure layer 2 includes the first area A composed of a first microstructure with a small specific volume, the second area B composed of a second microstructure with a large specific volume and the flat unstructured third area C. The first microstructure may be one of periodic structures or aperiodic structures, or a combination, and the cross section structure may be one of a sinusoidal structure, a rectangular grating structure, a half round structure and a blazed grating structure, or a combination. The specific size (for example, period, depth and the like) of the first microstructure is determined by the optical effect that needs to be formed. In general, the specific volume of the first microstructure is greater than 0.05 um$^3$/um$^2$, and smaller than 0.5 um$^3$/um$^2$, more preferably greater than 0.1 um$^3$/um$^2$ and smaller than 0.3 um$^3$/um$^2$, in order to meet the needs of showing specific optical effects and subsequent hollowing processes. The second microstructure may also be one of periodic structures or aperiodic structures, or a combination, and the cross section structure may be one of a sinusoidal structure, a rectangular grating structure, a half round structure, a trapezoidal structure and a blazed grating structure, or a combination. The second microstructure is completely used for hollowing, and an optical effect is not formed in a final product, so that the shape of the microstructure may be designed according to hollowing requirements. Generally, the larger the specific volume of the microstructure, the more favorable the hollowing. However, the larger the specific volume of the microstructure, the wider and deeper the microstructure, and the higher the difficulty of mass production. Preferably, the specific volume of the second microstructure is greater than 0.1 um$^3$/um$^2$, and smaller than 1 um$^3$/um$^2$, more preferably greater than 0.2 um$^3$/um$^2$ and smaller than 0.5 um$^3$/um$^2$.

Figure 5:
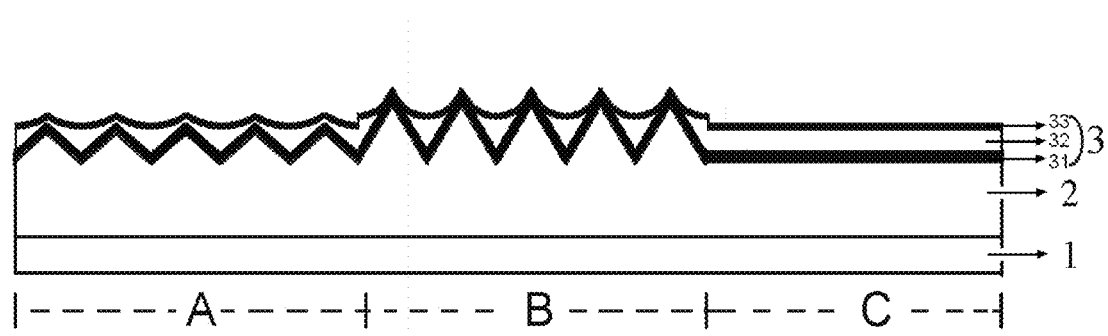
FIG. 5 is a schematic diagram of a cross-sectional view of a semi-finished product after an undulating structure layer having a reflecting layer, a dielectric layer and an absorbing layer is formed according to an embodiment (with a first surface microstructure) of the disclosure.

In S12, a reflecting layer 31, a dielectric layer 32 and an absorbing layer 33 are sequentially formed on the undulating structure layer 2, the reflecting layer 31 and the absorbing layer 33 are formed through vapor deposition, and the dielectric layer 32 is formed through printing, as shown in FIG. 5.

The reflecting layer 31 needs to have a strong reflection effect, generally adopts a high-reflection metal plating layer, and may be a single-layer plating layer, or a multi-layer metal plating layer, or a multi-metal mixed plating layer. The material of the reflecting layer may be a metal such as Al, Cu, Ni, Cr, Ag, Fe, Sn, Au and Pt, or a mixture or alloy thereof, and aluminum is preferable because aluminum is low in cost and high in brightness. The reflecting layer 31 is formed on the undulating structure layer 2 by a vapor deposition method, for example, including, but not limited to, thermal evaporation, magnetron sputtering, and the like. Preferably, the reflecting layer 31 is formed on the undulating structure layer 2 in a conformal or substantially conformal coverage manner with uniform surface density. The thickness of the reflecting layer 31 is generally selected to be greater than 10 nm and smaller than 80 nm, preferably greater than 20 nm and smaller than 50 nm. If the reflecting layer 31 is too thin, the brightness is insufficient; and if the reflecting layer 31 is too thick, the fastness to the undulating structure layer is poor, and the cost also increases.

The dielectric layer 32 is realized by a printing process. Printing, as used herein, refers to a process in which a liquid varnish is applied to a film and then dried and cured, may be formed on the entire area of the film (referred to as a coating process) or may be formed on a partial area of the film (referred to as a printing process) in terms of forming area, and may be performed by spraying coating, roller coating, flexographic printing, gravure printing, screen printing, or the like in terms of implementation techniques. Such a process allows the surface of the dielectric layer 32 of the first area A to realize non-conformal coverage with the reflecting layer 31, so that no or weak interference optically variable feature is available after the absorbing layer 33 is finally formed. The dielectric layer 32 simultaneously provides the role of the protection layer in the following hollowing process. The amount of printing of the dielectric layer 32 should be such that the minimum thickness of the reflecting layer 31 of the first area A is significantly smaller than the minimum thickness of the reflecting layer 31 of the second area B. Generally, the minimum thickness of the coating layer is located at the very top of the microstructure. In this way, in a later hollowing process, the dielectric layer 32 may provide effective protection for the reflecting layer 31 of the first area A, but not for the reflecting layer 31 of the second area B, in a corrosive atmosphere that may react with the material of the reflecting layer. A main resin of the dielectric layer 32 may be composed of polyurethane, acrylic acid and polyester, or a combination of polyurethane, acrylic acid and polyester. The third area C is used as an interference optically variable area, and the flatter the surface of the dielectric layer 32, the more favorable the formation of an effective Fabry-Perot interference cavity. Therefore, the dielectric layer 32 should have a very low viscosity before printing, for example, below 20 cps, which enables better leveling on the reflecting layer 31. For most resins, the refractive index is around 1.5, and the printing thickness of the dielectric layer 32 should be in the range of 200 nm to 800 nm in order to obtain a good optically variable effect. The specific thickness should be determined according to the required color and hollowing conditions.

The material of the absorbing layer 33 may be a metal such as Al, Cu, Ni, Cr, Ag, Fe, Sn, Au and Pt, or a mixture or alloy thereof, and nickel or chromium is preferable because nickel or chromium still has high chemical stability under a very thin state and has low cost. The absorbing layer 33 is formed by a vapor deposition method, for example, including, but not limited to, thermal evaporation, magnetron sputtering, and the like. Preferably, the absorbing layer 33 is formed on the dielectric layer 32 in a conformal or substantially conformal coverage manner with uniform surface density. The thickness of the absorbing layer 33 is generally small, typically smaller than 10 nm. If the absorbing layer 33 is too thin, the optically variable effect is poor; and if the absorbing layer 33 is too thick, the color is too dark. The thickness of the absorbing layer 33 generally corresponds to a light transmittance of greater than 10% and smaller than 80%, preferably greater than 20% and smaller than 50%.

Figure 6:
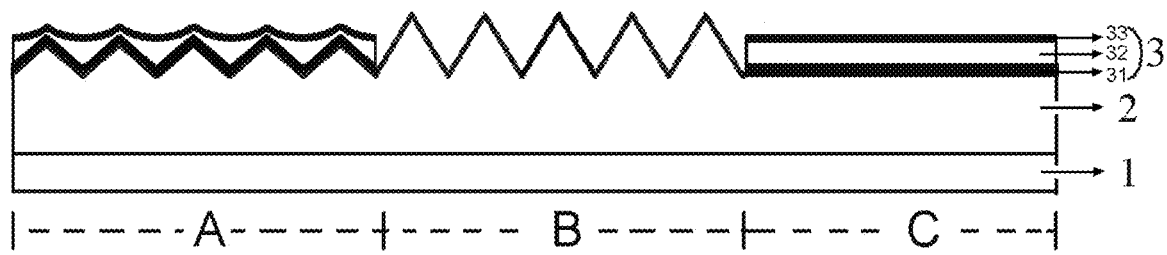
FIG. 6 is a schematic diagram of a cross-sectional view of a semi-finished product after a reflecting layer of a second area of an undulating structure layer is corroded according to an embodiment (with a first surface microstructure) of the disclosure.

In S13, the semi-finished product is put in a corrosive atmosphere capable of reacting with the material of the reflecting layer 31 until the reflecting layer 31 of the second area A is completely or partially removed, as shown in FIG. 6.

As described above, the amount of printing of the dielectric layer 32 should be such that the minimum thickness of the reflecting layer 31 of the first area A is significantly smaller than the minimum thickness of the reflecting layer 31 of the second area B. Since the thickness of the absorbing layer 33 is extremely small, substantially no protection is provided for the reflecting layer 31. Therefore, the dielectric layer 32 may provide effective protection for the reflecting layer 31 of the first area A, but not for the reflecting layer 31 of the second area B. In the corrosive atmosphere capable of reacting with the material of the reflecting layer 31, after a certain time, the reflecting layer 31 of the second area B is corroded and removed, but the reflecting layer 31 of the first area A is not or basically not corroded. Of course, since the third area C has no microstructure, the thickness of the dielectric layer 32 is consistent and large, and the reflecting layer 31 may be effectively protected in the corrosive atmosphere. Generally, after the reflecting layer 31 of the second area B is removed, the dielectric layer 32 and the absorbing of the second area B are also floated and stripped. So far, the optical effect of the optical security element shown in FIG. 2 is formed, namely, the first area A has a microstructure optical anti-counterfeiting feature but no or weak interference optically variable feature, while the third area C has a significant interference optically variable feature but no microstructure optical feature during reflection observation from one side of the absorbing layer 33; and during perspective observation, the second area B has a light-transmitting hollowing feature.

Figure 7:
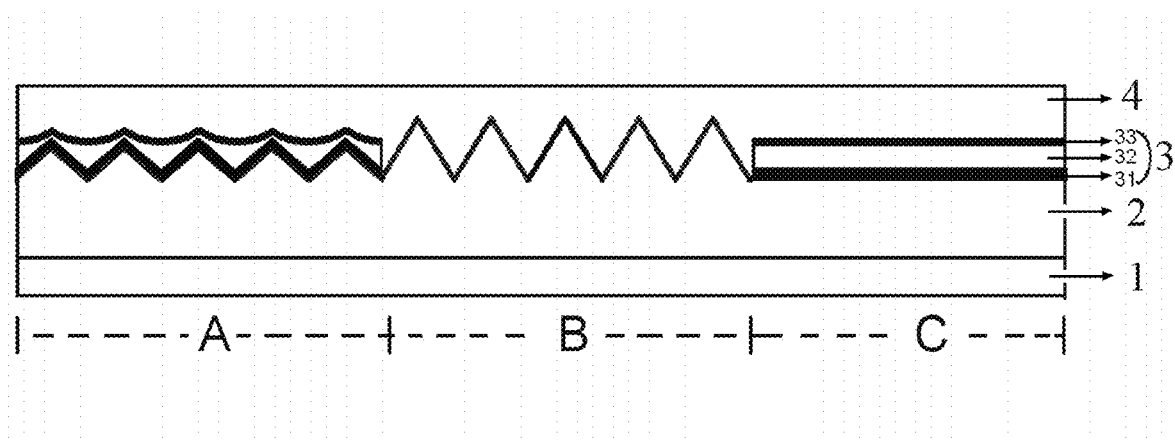
FIG. 7 is a schematic diagram of a cross-sectional view of a semi-finished product after other function coating layers are formed according to an embodiment (with a first surface microstructure) of the disclosure.

The method for manufacturing the optical anti-counterfeiting element as shown in FIG. 2 generally further includes, after S13, other function coating layers are printed, for example, a bonding layer is formed to bond to the protected product, as shown in FIG. 7.

Embodiment 2

A method for manufacturing an anti-counterfeiting element as shown in FIG. 2 according to the disclosure will be described below in combination with FIG. 5. The method includes steps S21 to S24.

Figure 8:
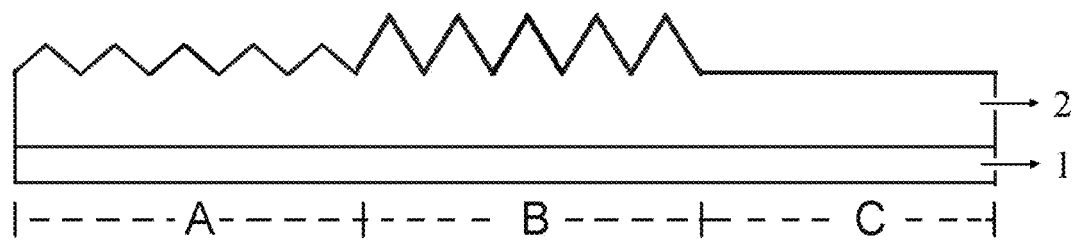
FIG. 8 is a schematic diagram of a cross-sectional view of a semi-finished product after an undulating structure layer having a first area, a second area and a third area is formed according to an embodiment (with a second surface microstructure) of the disclosure.

In S21, an undulating structure layer 2 is formed on a substrate 1, the undulating structure layer 2 includes a first area A composed of a first microstructure with a small specific volume, a second area B composed of a second microstructure with a large specific volume and a flat unstructured third area C, as shown in FIG. 8.

The requirements for the substrate and the undulating structure layer are exactly the same as those in S11. The details will not be elaborated herein.

Figure 9:
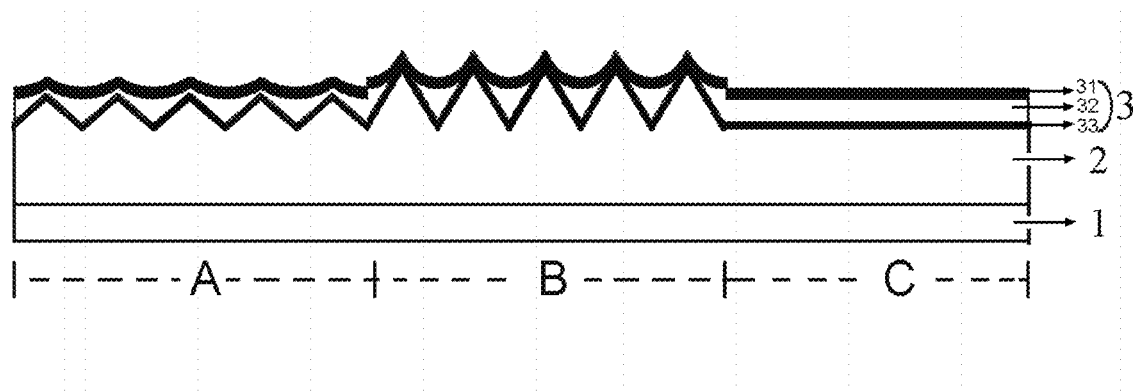
FIG. 9 is a schematic diagram of a cross-sectional view of a semi-finished product after an undulating structure layer having a reflecting layer, a dielectric layer and an absorbing layer is formed according to an embodiment (with a second surface microstructure) of the disclosure.

In S22, an absorbing layer 33, a dielectric layer 32 and a reflecting layer 31 are sequentially formed on the undulating structure layer 2, the reflecting layer 31 and the absorbing layer 33 are formed through vapor deposition, and the dielectric layer 32 is formed through printing, as shown in FIG. 9.

Here, the order in which the absorbing layer, the dielectric layer and the reflecting layer are formed is different from that in S12. Due to the formation sequence, only the reflecting layer is removed in the subsequent process of hollowing out the reflecting layer, and the dielectric layer and the absorbing layer is not removed. The dielectric layer is only configured to provide interference optically variable feature and does not have a protection effect on the plating layer in the hollowing process. Therefore, the thickness setting of the dielectric layer is primarily determined by the third area C forming the desired interference optically variable color feature. Meanwhile, the application thickness of the dielectric layer should ensure that the surface of the dielectric layer still has a large specific volume so as to meet the requirement of subsequent hollowing.

The material and process requirements of the absorbing layer and the reflecting layer are exactly the same as those in S12. The details will not be elaborated herein.

Figure 10:
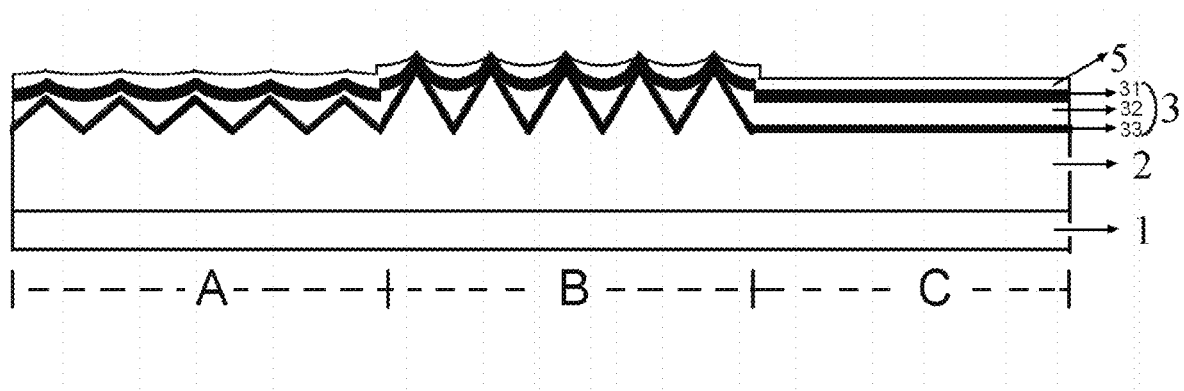
FIG. 10 is a schematic diagram of a cross-sectional view of a semi-finished product after a protection layer is applied to an undulating structure layer according to an embodiment (with a second surface microstructure) of the disclosure.

In S23, a protection layer printing process is applied on the reflecting layer, and the minimum thickness of the protection layer of the first area is obviously greater than the minimum thickness of the protection layer of the second area, as shown in FIG. 10.

The protection layer 5 provides a protection effect on the reflecting layers 31 of the first area A and the third area C in the hollowing process. Therefore, the amount of printing of the protecting layer 5 should be such that the minimum thickness of the reflecting layer 31 of the first area A is significantly smaller than the minimum thickness of the reflecting layer 31 of the second area B. Generally, the minimum thickness of the coating layer is located at the very top of the microstructure. Therefore, in a later hollowing process, the protection layer 5 may provide effective protection for the reflecting layers of the first area A and the third area C, but not for the reflecting layer 31 of the second area B, in a corrosive atmosphere capable of reacting with the material of the reflecting layer 31. A main resin of the protection layer 5 may be composed of polyurethane, acrylic acid and polyester, or a combination of polyurethane, acrylic acid and polyester.

Figure 11:
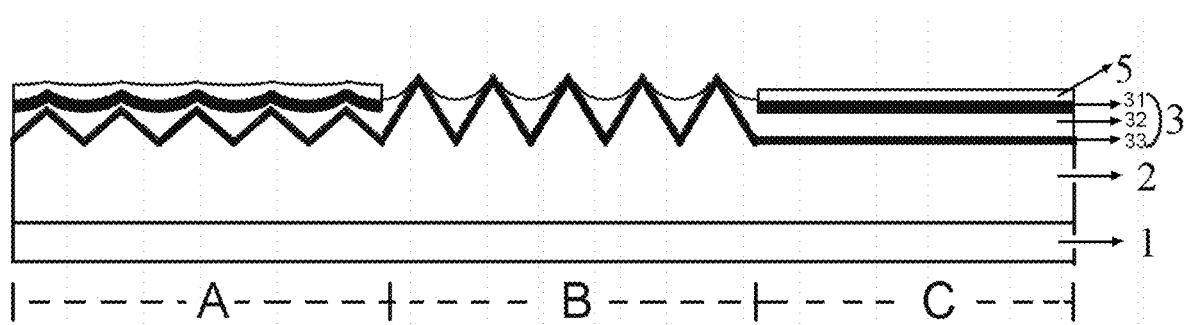
FIG. 11 is a schematic diagram of a cross-sectional view of a semi-finished product after a reflecting layer of a second area of an undulating structure layer is corroded according to an embodiment (with a second surface microstructure) of the disclosure.

In S24, the semi-finished product is put in a corrosive atmosphere capable of reacting with the material of the reflecting layer 31 until the reflecting layer 31 of the second area is completely or partially removed, as shown in FIG. 11.

In the corrosive atmosphere capable of reacting with the material of the reflecting layer 31, after a certain time, the reflecting layer 31 of the second area B is corroded and removed, and the reflecting layers of the first area A and the third area C are not or basically not corroded. At the moment, the reflecting layer 31 of the second area B is removed, the protection layer on the reflecting layer 31 is also floated and stripped, and neither the dielectric layer 32 nor the absorbing layer 33 is removed generally. But if the absorbing layer 33 may also react with the corrosive atmosphere, the dielectric layer 32 and the absorbing layer 33 may also be removed. So far, the optical effect of the optical anti-counterfeiting element shown in FIG. 3 is formed, namely, the first area A has a microstructure optical anti-counterfeiting feature but no or weak interference optically variable feature, while the third area C has a significant interference optically variable feature but no microstructure optical feature during reflection observation from one side of the absorbing layer 33; and during perspective observation, the second area B has a light-transmitting hollowing feature.

Figure 12:
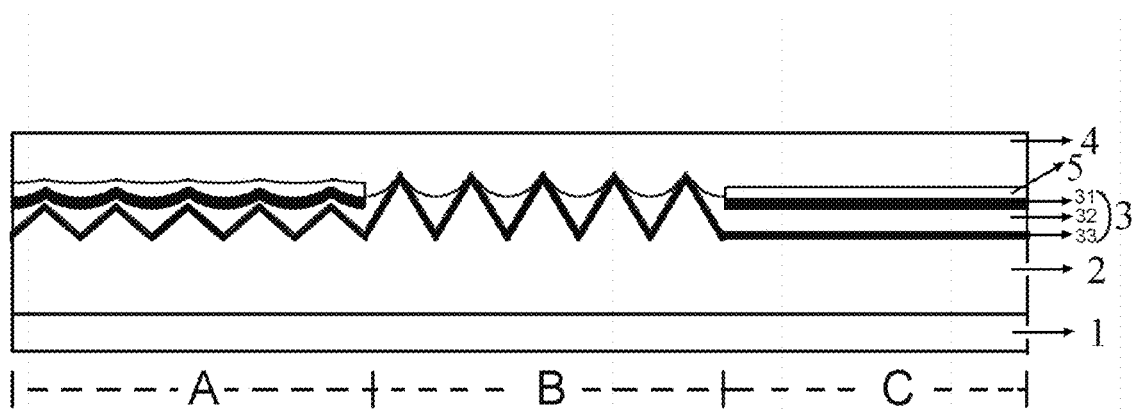
FIG. 12 is a schematic diagram of a cross-sectional view of a product after other function coating layers are formed according to an embodiment (with a second surface microstructure) of the disclosure.

The method for manufacturing the optical anti-counterfeiting element as shown in FIG. 3 generally further includes that, after S24, other function coating layers are printed, for example, a bonding layer is formed to bond to the protected product, as shown in FIG. 12.

The method for manufacturing the optical anti-counterfeiting element according to the disclosure is suitable for manufacturing window security threads, labels, logos, wide strips, transparent windows, films, and the like. Anti-counterfeiting paper with the window security threads is configured for anti-counterfeiting of various high-security products such as banknotes, passports and securities.

Optional implementation modes of the embodiments of the disclosure are described in detail above with reference to the drawings, but the embodiments of the disclosure are not limited to specific details in the above implementation modes, various simple modifications may be made to the technical solutions of the embodiments of the disclosure within the scope of the technical idea of the embodiments of the disclosure, and these simple modifications all fall within the scope of protection of the embodiments of the disclosure.

It is further to be noted that the various specific technical features described in the above detailed implementation modes may be combined in any suitable manner without contradiction. In order to avoid unnecessary repetition, the various possible combinations of the embodiments of the disclosure will not be otherwise described.

Those skilled in the art should understand that all or part of the steps in the methods for implementing the embodiments may be completed by instructing related hardware through a program, and the program is stored in a storage medium, and includes a plurality of instructions enabling a single-chip microcomputer, chip, or processor to perform all or part of the steps of the methods described in the embodiments of the disclosure. The foregoing storage medium includes any medium that be store program codes, such as a U disk, a removable hard disk, a Read-Only Memory (ROM), a Random Access Memory (RAM), a magnetic disk, or an optical disc.

In addition, any combination of the various implementation modes of the embodiments of the disclosure may also be made, which should also be considered as disclosed as long as they do not depart from the idea of the embodiments of the disclosure.

What is claimed is:

1. An optical anti-counterfeiting element, comprising:
    an undulating structure layer provided with a first area, a second area and a third area; wherein the first area has a first microstructure; the second area has a second microstructure; the third area is an unstructured flat area;
    a specific volume of the second microstructure is greater than a specific volume of the first microstructure;
    the first area and the third area are respectively provided with a reflecting layer, a dielectric layer and an absorbing layer which are overlapped, and the second area is not provided with the reflecting layer; and
    a surface appearance of one side, far away from the undulating structure layer, of the dielectric layer of the first area is different from a surface appearance of the undulating structure layer;
    the first microstructure is one of a periodic structure or an aperiodic structure, of a combination of the periodic structure of the aperiodic structure; and
    a cross section structure of the first microstructure along extension direction is one of a sinusoidal structure a rectangular grating structure, a half round structure and a blazed grating structure, or a structure formed by combining at least any two of the sinusoidal structure, the rectangular grating structure, the half round structure and the blazed grating structure;
    the dielectric layer is formed through printing;
    the second area is taken as a hollowed-out area, the second area is arranged between the first area and the bird area.

2. The optical anti-counterfeiting element according to claim 1, wherein
    a range of the specific volume of the first microstructure is greater than 0.05 $um^3/um^2$ and smaller than 0.5 $um^3/um^2$.

3. The optical anti-counterfeiting element according to claim 2, wherein
    the range of the specific volume of the first microstructure is greater than 0.1 $um^3/um^2$ and smaller than 0.3 $um^3/um^2$.

4. The optical anti-counterfeiting element according to claim 1, wherein
    the second microstructure is one of a periodic structure and an aperiodic structure, or a combination of the periodic structure and the aperiodic structure; and
    a cross section structure of the second microstructure along an extension direction is one of a sinusoidal structure, a rectangular grating structure, a half round structure, a trapezoidal structure and a blazed grating structure, or a structure formed by combining at least any two of the sinusoidal structure, the rectangular grating structure, the half round structure, the trapezoidal structure and the blazed grating structure.

5. The optical anti-counterfeiting element according to claim 1, wherein
    a range of the specific volume of the second microstructure is greater than 0.1 $um^3/um^2$ and smaller than 1 $um^3/um^2$.

6. The optical anti-counterfeiting element according to claim 5, wherein
    the range of the specific volume of the second microstructure is greater than 0.2 $um^3/um^2$ and smaller than 0.5 $um^3/um^2$.

7. The optical anti-counterfeiting element according to claim 1, wherein
    a material of the reflecting layer comprises one of aluminum, silver, copper, tin, chromium, nickel and titanium, or an alloy formed by combining at least any two of aluminum, silver, copper, tin, chromium, nickel and titanium;
    a main resin of the dielectric layer comprises one of polyurethane, acrylic acid and polyester, or a polymer formed by combining at least any two of polyurethane, acrylic acid and polyester; and
    the material of the absorbing layer comprises one of nickel, chromium, aluminum, silver, copper, tin and titanium, or an alloy formed by combining at least any two of nickel, chromium, aluminum, silver, copper, tin and titanium.

8. The optical anti-counterfeiting element according to claim 1, wherein
    the reflecting layer is adjacent to the undulating structure layer.

9. The optical anti-counterfeiting element according to claim 8, wherein
    the second area is not provided with a dielectric layer and an absorbing layer.

10. The optical anti-counterfeiting element according to claim 1, wherein
    the absorbing layer is adjacent to the undulating structure layer.

11. The optical anti-counterfeiting element according to claim 1, wherein
    the second area is provided with the dielectric layer and the absorbing layer.

12. A manufacturing method of an optical anti-counterfeiting element, comprising:
    S1), forming an undulating structure layer, wherein the undulating structure layer comprises a first area, a second area and a third area, the first area has a first microstructure, the second area has a second microstructure, a specific volume of the second microstructure is greater than a specific volume of the first microstructure, and the third area is an unstructured flat area, the second area is arranged between the first area and the third area;
    S2), sequentially forming a reflecting layer, a dielectric layer and an absorbing layer on the undulating structure layer, wherein the reflecting layer is formed through vapor deposition, the dielectric layer is formed through printing, and the absorbing layer is formed through vapor deposition; and
    S3), putting the semi-finished product in S2) in a corrosive atmosphere capable of reacting with a material of the reflecting layer until the reflecting layer of the second area is completely or partially removed, wherein the second area is taken as a hollowed-out area.

13. The manufacturing method according to claim 12, wherein S3) further comprises the following sub-step, in the process that the reflecting layer of the second area is completely or partially removed:
    completely or partially removing the dielectric layer and the absorbing layer of the second area.

14. The manufacturing method according to claim 13, further comprising:
    applying an inorganic or organic plating layer, or applying a coating layer, so that other optical anti-counterfeiting functions or auxiliary functions are realized.

15. The manufacturing method according to claim 12, further comprising:

an inorganic or organic plating layer, or applying a coating layer, so that other optical anti-counterfeiting functions or auxiliary functions are realized.

16. A manufacturing method of an optical anti-counterfeiting element, comprising:
S1), forming an undulating structure layer, wherein the undulating structure layer comprises a first area, a second area and a third area, the first area has a first microstructure, the second area has a second microstructure, a specific volume of the second microstructure is greater than a specific volume of the first microstructure, and the third area is an unstructured flat area, the second area is arrange between the first area and the area;
S2), sequentially forming an absorbing layer, a dielectric layer and a reflecting layer on the undulating structure layer, wherein the reflecting layer is formed through vapor deposition, the dielectric layer is formed through printing, and the absorbing layer is formed through vapor deposition;
S3), after the reflecting layer is formed, applying a printing process in a different thickness mode to form a protection layer, and the different thickness mode is that the minimum thickness of the protection layer of the first area is greater than the minimum thickness of the protection layer of the second area; and
S4), putting the semi-finished product in S3) in a corrosive atmosphere capable of reacting with a material of the reflecting layer for permeability improvement until the reflecting layer of the second area is completely or partially removed, wherein the second area is taken as a hollowed-out area.

17. The manufacturing method according to claim 16, wherein S4) further comprises the following sub-step, in the process that the reflecting layer of the second area is completely or partially removed:
removing the reflecting layer of the second area, and removing neither the dielectric layer nor the absorbing layer.

18. The manufacturing method according to claim 17, further comprising:
applying an inorganic or organic plating layer, or applying a coating layer, so that other optical anti-counterfeiting functions or auxiliary functions are realized.

19. The manufacturing method according to claim 16, further comprising:
applying an inorganic or organic plating layer, or applying a coating layer, so that other optical anti-counterfeiting functions or auxiliary functions are realized.

* * * * *